(12) United States Patent
Pitts

(10) Patent No.: US 6,446,569 B1
(45) Date of Patent: Sep. 10, 2002

(54) BOAT TO TRAILER CONVERSION

(76) Inventor: Ronnie H. Pitts, 9949 Puopolo La., Bonita Springs, FL (US) 34135

( * ) Notice: Subject to any disclaimer, the term of this patent is extended or adjusted under 35 U.S.C. 154(b) by 0 days.

(21) Appl. No.: 09/877,740

(22) Filed: Jun. 11, 2001

(51) Int. Cl.⁷ .................................................. B60P 3/10
(52) U.S. Cl. ........................................................ 114/344
(58) Field of Search ................................ 114/344, 61.1; 403/321, 322.3, 324, 326, 330

(56) References Cited

U.S. PATENT DOCUMENTS

| | | | | |
|---|---|---|---|---|
| 2,929,079 A | * | 3/1960 | Totten | 114/344 |
| 3,035,282 A | * | 5/1962 | Bemis | 114/344 |
| 3,599,256 A | * | 8/1971 | Carroll, Jr. | 114/344 |
| 4,480,578 A | * | 11/1984 | Fisher et al. | 114/344 |
| 4,567,844 A | * | 2/1986 | Johnson | 114/344 |

* cited by examiner

Primary Examiner—Stephen Avila

(57) ABSTRACT

The invention pertains to a boat to trailer conversion apparatus. The invention includes a pneumatic wheel being supported by a support column on a side of the boat in a ground contacting position. There is a releasable arrest mechanism that arrests the support column at a side of the boat when the wheel contacts the ground. When it is desirous to convert the boat to a trailer to be towed by a towing vehicle, a latch is pulled upwardly on the deck of the boat whereby the support column will be released and the wheel can swing upwardly together with its support column around a hinge pin at the level of the deck. A continued rotation will settle the wheel in a wheel well below the deck of the boat. Thereby, the wheel will have undergone a rotation around the hinge pin from the ground contacting position to the stored through an angle of substantially 270 degrees.

7 Claims, 7 Drawing Sheets

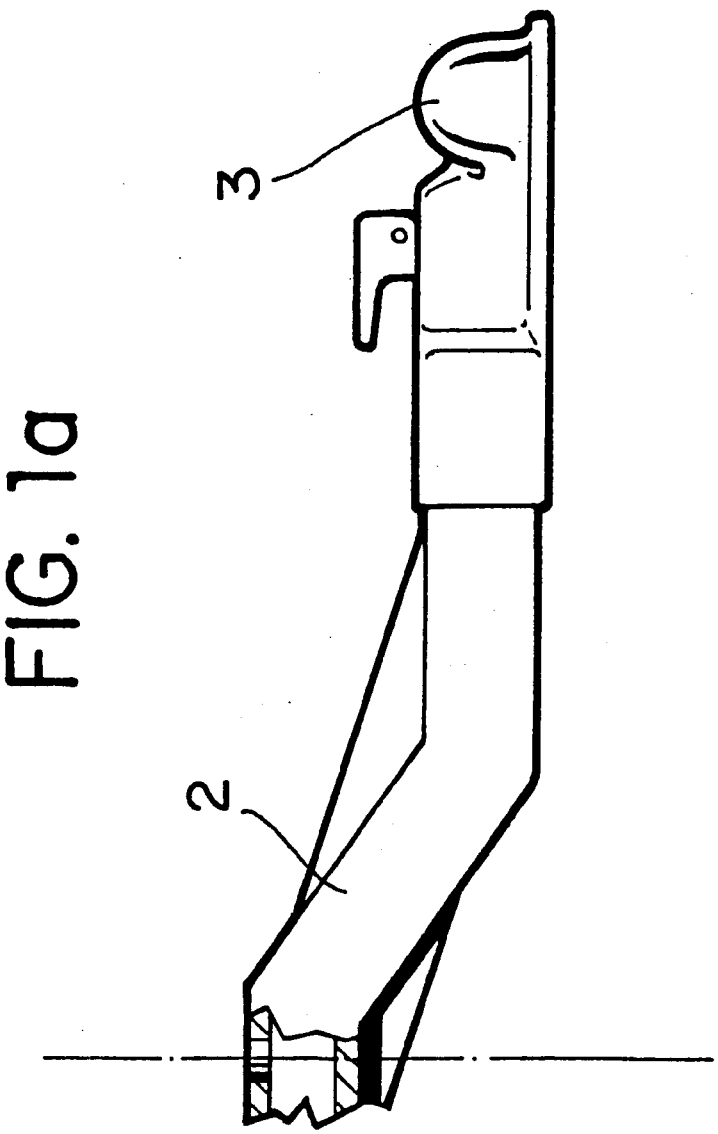
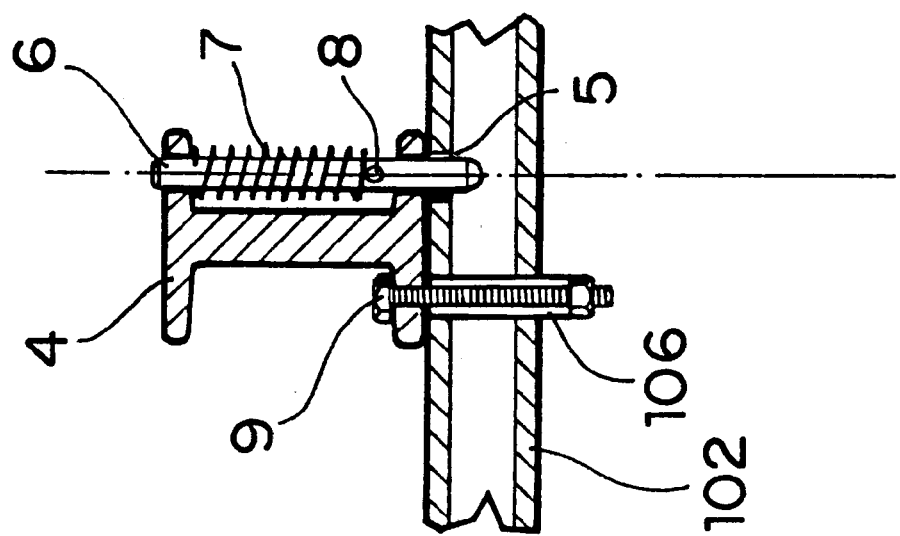
FIG. 1a

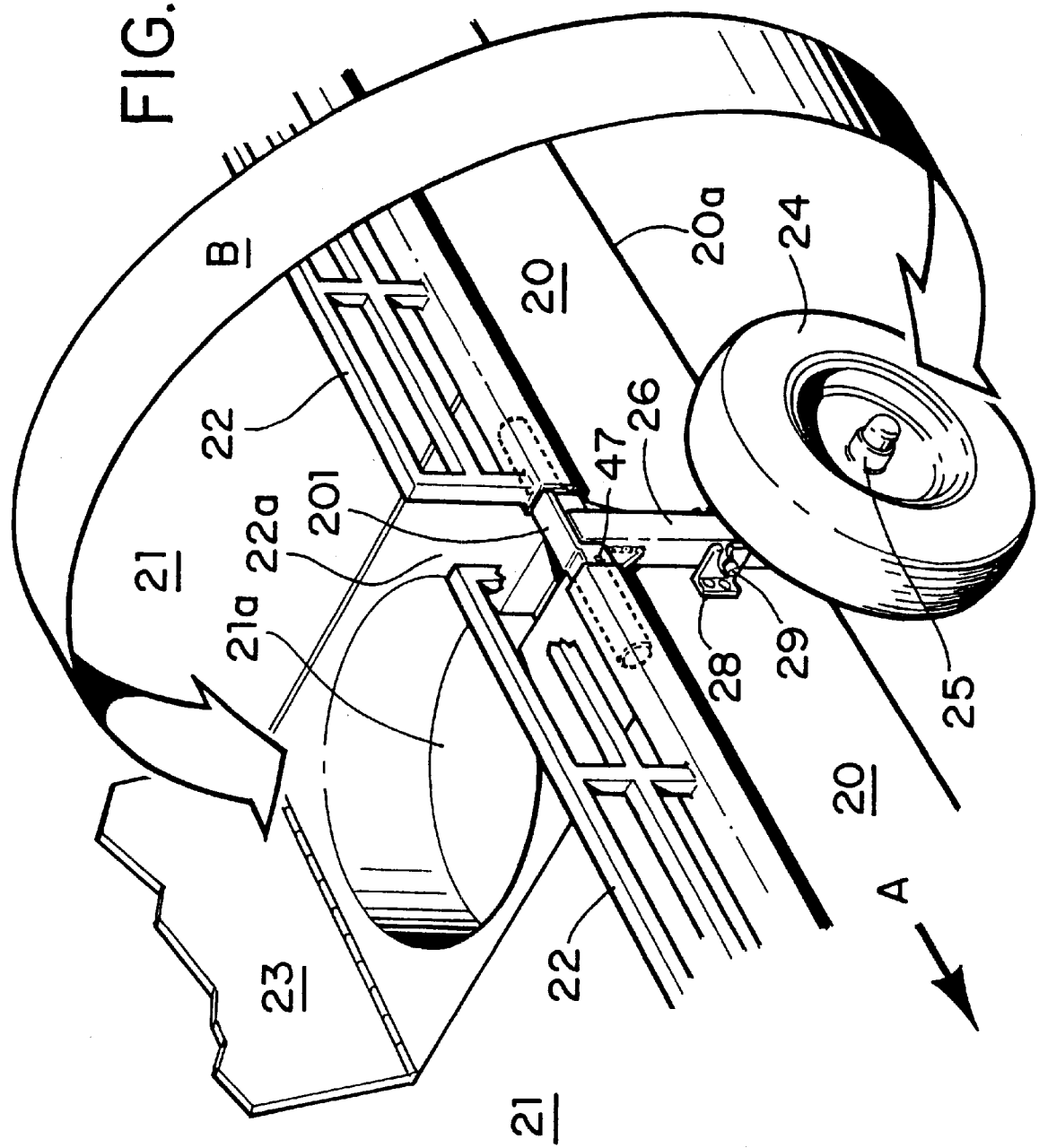

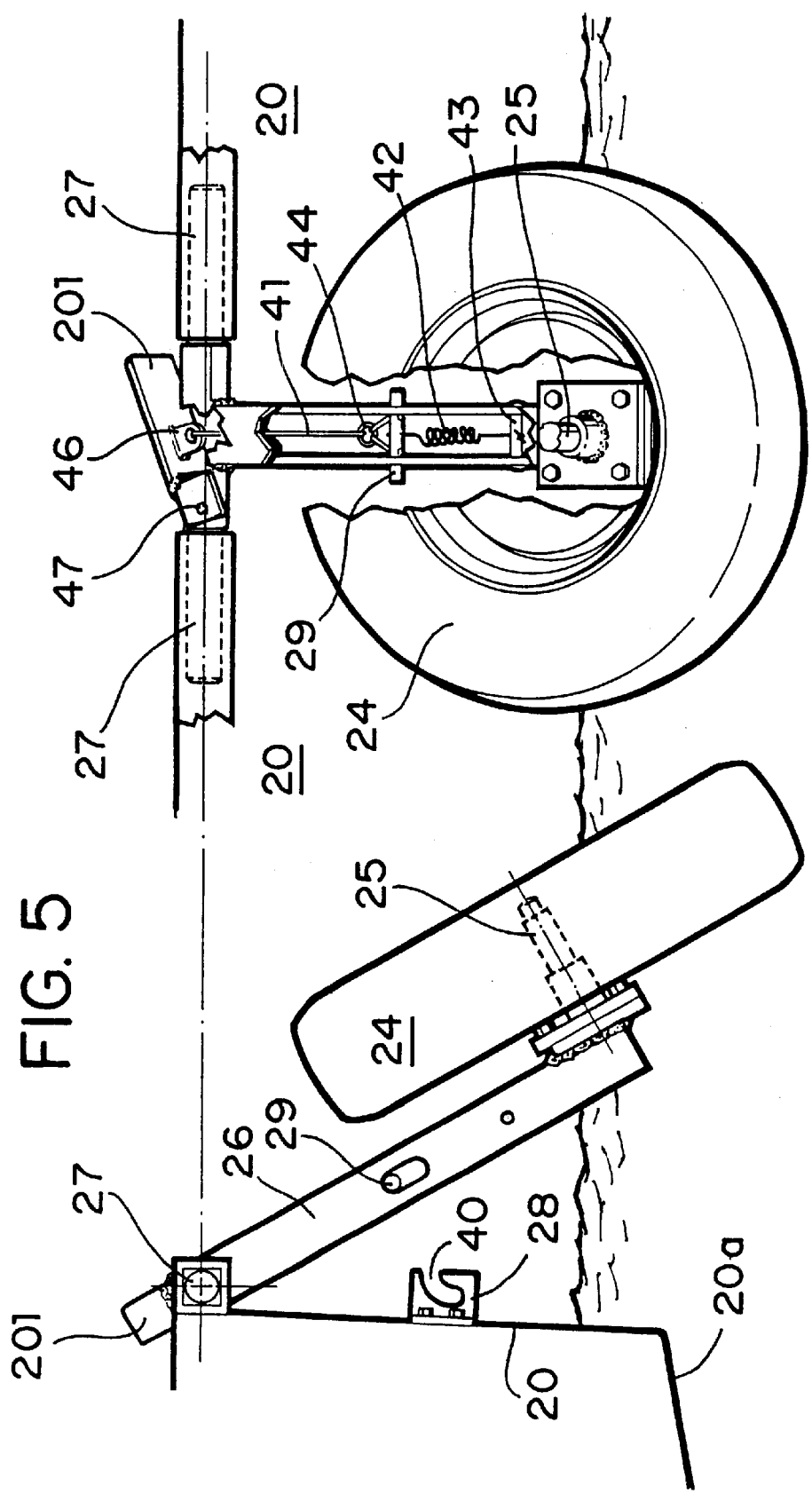

BOAT TO TRAILER CONVERSION

CROSS REFERENCE TO RELATED APPLICATION (none)

STATEMENT REGARDING FED SPONSORED R & D (none)

REFERENCE TO MICROFICHE APPENDIX (none)

BACKGROUND OF THE INVENTION

1. Field of the Invention

The present invention resides in the provision of movable wheels on a pontoon boat or a flat bottom boat so that the boat can easily be converted to a land vehicle in the form of a trailer to be towed by a towing vehicle 2. Description of the Prior Art U.S. Pat. No. 3,755,838 shows a boat to trailer conversion wherein a wheel on each side of the boat is retracted by swinging each of the wheels upwardly into a space specifically provide in the hull of the boat.

U.S. Pat. No. 3,877,094 discloses a pontoon boat having retractable pairs of wheels which are swung upwardly and outwardly through an angle of about 90° into and out of way positions so that the pontoon can float on the water.

U.S. Pat. No. 3,941,074 illustrates a conversion of a bus which is adapted to be driven over highways in the usual manner. The bus is equipped with elongated wheel housings which are pivoted to opposite side walls to swing from a horizontal position to a vertical position. The bus is not intended to be towed.

U.S. Pat. No. 4,008,679 shows a boat that can temporarily be converted to a self-driven vehicle by vertically extending three wheels donwardly below the bottom of the boat. One of the wheels is powered so that the boat can be driven into and out of the water on a ramp. It can only be transported on a trailer thereafter.

U.S. Pat. No. 4,023,222 illustrates a pontoon boat having retractable wheels which are retractable in a vertical manner and out of the way between the space of the individual and separate pontoons.

U.S. Pat. No. 4,036,507 shows a boat which is generally of the car top size and is not intended to be towed by a towing vehicle. Swingable sets of wheels mounted on the transom of the boat can swing up or down to be temporarily available to transport the boat like a wheel barrow.

U.S. Pat. No. 4,398,489 discloses a boat that can be converted to a trailer to be towed on land. A separate space is provided on each side of the boat wherein in each of the space a wheel is driven up or down to be either retracted so that the boat can float or driven down to make contact with the ground.

U.S. Pat. No. 4,515,102 shows a boat conversion that can either float on the water or wheels can be provided so that the boat can be pulled as a trailer on the highway. A wheel can be mounted on each side of the boat and then swing up and down through substantially 180°. The wheels in the up position will always be visible to an observer.

U.S. Pat. No. 4,588,203 shows a retractable wheel assembly for attachment to a boat especially at its transom so that the boat can be transported over a hard surface. The intent is not for a transport over a highway.

U.S. Pat. No. 4,567,844 shows a boat having a short haul supporting device consisting of a pair of wheels that are journalled by horizontal axis struts which are connected with the boat transom by pivotally connected plates to support the boat's stern.

U.S. Pat. No. 5,072,963 discloses a combined trailer home and boat assembly adapted to be towed behind a motor vehicle including a trailer having a frame structure supported on a plurality of wheels and including a support cradle for supporting a boat in a stowed position.

U.S. Pat. No. 5,425,326 illustrates a boat having removable L-shaped brackets mounted at the transom of a boat and the bottoms of the L-shapes each having a wheel mounted thereon to be in contact with the ground for transport.

U.S. Pat. No. 5,813,359 shows a rowboat with a pair of permanently mounted wheels installed in the middle of opposed sides of the bottom of the boat. A pair of wheel wells isolate the wheels from the interior of the boat.

U.S. Pat. No. 6,067,925 shows a pontoon boat having a support framework that includes a number of telescoping cross members that laterally extend and retract to vary the width of the craft, Included are tires that rotate in and out of ground contact to permit towing of the boat without the need for a separate trailer.

U.S. Pat. No. 6,159,085 shows a boat having two rear wheels each retractably supported within a compartment and a front wheel is also retractably supported in another compartment of the bow of the boat. All wheels can swing up and down in a vertical plane. The rear wheels in a down position and the front wheel in an up position render the boat to be used as a trailer. When the front wheel is also down, the boat can roll on its own.

BRIEF SUMMARY OF THE INVENTION

The boat of the invention has been designed having the ease of operation in mind and also the cost of constructing the boat. The invention can be installed on a two hull pontoon boat or a single hull flat bottom pontoon boat. In its simplest form, a bracket is rotatably mounted on each side of the boat having a regular trailer wheel mounted at its bottom as seen in a down position. When the boat is floating in the water, the wheel with its bracket is released from a bottom of the boat whereby the wheel will float to the surface of the water because of the pneumatic tire. A further up rotation will rotate the bracket over the edge of the boat and a further and continued rotation of the bracket together with the wheel will deposit the wheel in a special compartment provided under the deck. A cover over the compartment completely hides the wheel including the bracket under the deck. The rotation of the wheel as well as the bracket undergo a rotation of substantially 270°.

BRIEF DESCRIPTION OF THE DRAWINGS

FIG. 1a shows a lockable tow bar;

FIG. 2 shows a wheel of the boat in a ground contact position;

FIG. 5 shows a wheel assembly released from its locked position.

DETAILED DESCRIPTION OF THE INVENTION

Figure 1:
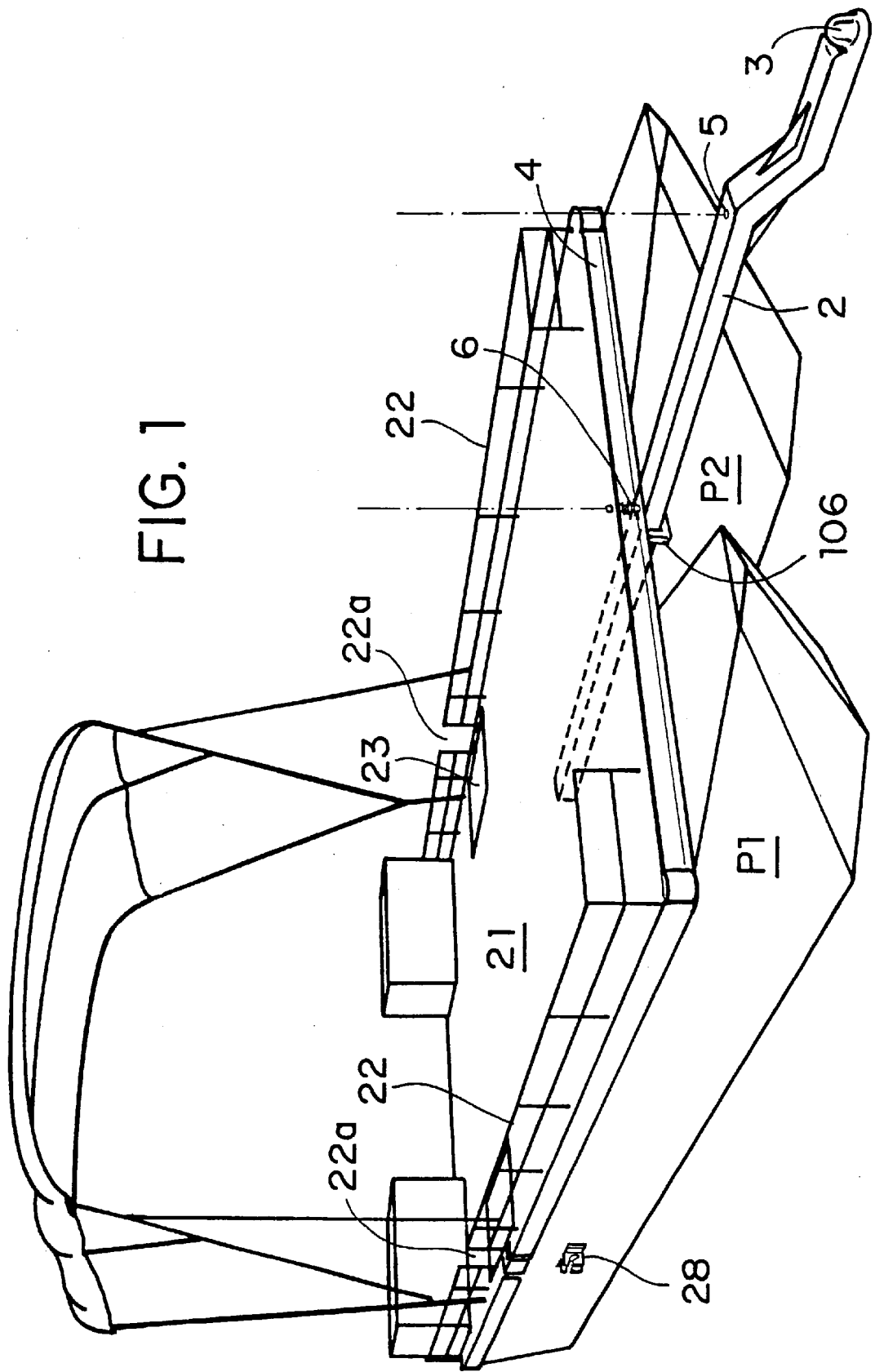
FIG. 1 is a perspective view of a pontoon boat having an extendible tow bar.

FIG. 1 shows a pontoon boat including two pontoons P1 and P2. The boat has an extendible tow bar 2 that can be extended from a towing position (FIG. 1) to a non-towing or out of way position as shown in (FIG. 1a). The front of the boat has an I beam 4 including a guide channel 106 for the tow bar 2. The I beam 4 further has a locking pin 6 therein to be lockingly inserted in the hole 5 in the tow bar 2. This operation will be explained below with reference to FIG. 1a. The boat has a boat deck 21 and a railing 22 surrounding the deck. In the railing 22 there are two openings 22a on each side of the boat. Also, the boat deck 21 has a wheel well cover plate 23 which is hinged to the boat deck 21. All of these items will be discussed further with reference to FIG. 2.

Turning now to FIG. 1a, there is shown the tow bar 2 of the boat in a retracted position. For this purpose, the two bar has a hole 5 therein which will be engaged by the pin 6 when the tow bar 2 is retracted. The pin 6 is slidingly received in the two flanges of the I beam 4 which is located at the front of the boat as is shown in FIG. 1. The lock pin 6 is under the bias of a spring 7 surrounding the lock pin 6. The spring has a counter pressure point by virtue of the cross pin 8 extending through the lock pin 6. With other words, the lock pin is always biased downwardly and thereby is self engaging with the hole 5. The tow bar has a socket 3 at its forward end to be engaged by a ball on the hitch of a towing vehicle.

Figure 1B:
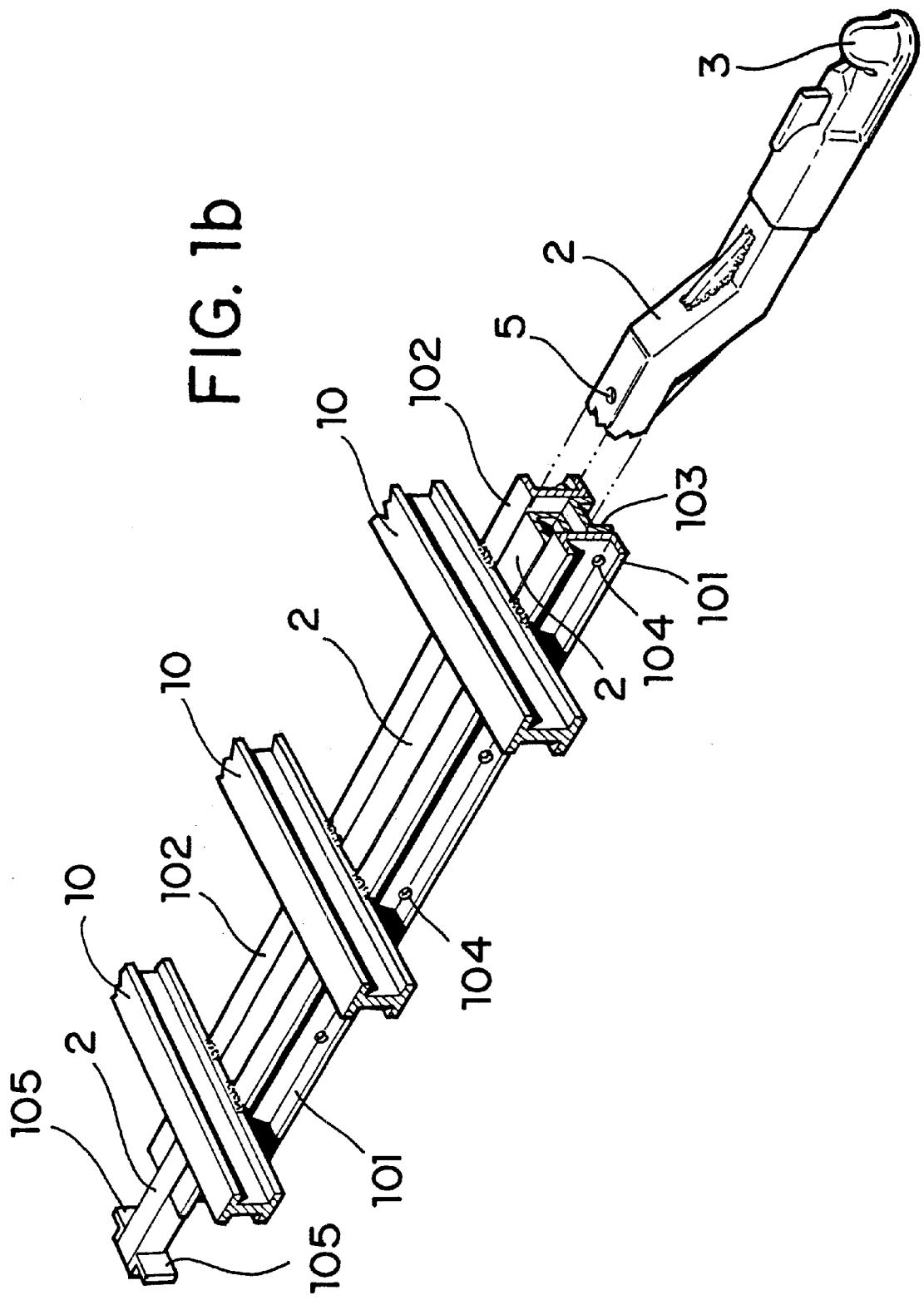
FIG. 1b shows a mounting of an extendible tow bar.

FIG. 1b illustrates how the tow bar 2 is slidingly supported under the deck of the boat. The deck 21 (FIGS. 1 and 2) is supported on a multiple of cross I beams 10. In the longitudinal center of the boat and under the I beams 10, two U shaped beams 101 and 102 are mounted on their sides and spaced apart just enough to receive the tow bar 2 in a snug but sliding manner. The open bottom between the two U shaped beams 101 and 102 is closed by another U shaped beam 103 and again at such a spacing to accommodate the tow bar 2 in a sliding manner. The bottom U-shaped beam 103 is fastened to the U-shaped beams 101 and 102 by having fasteners 104 passing through its flanges of the U. When the tow bar 2 is fully extended for towing purposes, a stop 105 at the end of the tow bar 2 will engage the ends of the two U-shaped beams 101 and 102 to thereby prevent the tow bar from farther extending outwardly. Another hole 5 on top of the tow bar 2 will now be engaged by the lock pin 6 to prevent the tow bar 2 from sliding back again. The top of the I beams 10 will then receive the deck of the boat.

FIG. 2 shows the wheel 24 of the boat in a ground contact position. The boat is shown as at 20 and the illustration of just one wheel is taken on the left side, that is, the portside of the boat. Of course, there is a mirror image of the wheel assembly on the other, that is, the starboard side of the boat. The arrow A indicates the direction of the bow of the boat and 20a shows the bottom of the boat. The deck is generally shown at 21 and the wheel well into which the wheel 24 will be stored is shown at 21a. There is a railing 22 placed around the deck 21 of the boat 20 which railing has a break 22a which will be explained below. Also the wheel well 21a has a hinged cover plate 23 which when set in place will be flush with the top of the dock 21. The wheel 24 is mounted on an axle 25 which in turn is mounted on a support column 26. The support column 26 is hingedly mounted to the horizontal hinge pin 27 which is fastened to the deck 21 of the boat 20. The hinge pin is mounted parallel to the longitudinal axis of the boat. This then establishes the fact that the wheel 24 together with its support column 26 can be swung around the hinge pin 27 in a direction which is normal to the longitudinal direction of ther boat ntil it is completely stored in the wheel well 21a. See the arrow B in FIG. 2. Therefore, for the wheel 24 to be moved from a ground engaging position to a completely stored position it has to undergo a rotation of an angle of 270° which is demonstrated by the arrow B. When the wheel 24 is in a ground engaging position, it must be rigidly locked in place. For this purpose the support column 26 is locked in place between two brackets 28, which brackets are fastened to the side of the boat 20. It could be the side of the portside pontoon or the side of a flat bottom boat. The invention is equally applicable to either one of the above mentioned boats. The two brackets 28 have a curving slot 40 therein to receive a locking pin therein to firmly lock the locking pin 29 and thereby the support column 26 in place. The locking pin 16 is biased downwardly so that it cannot unintentionally escape from the curved slot 28.

Figure 3:
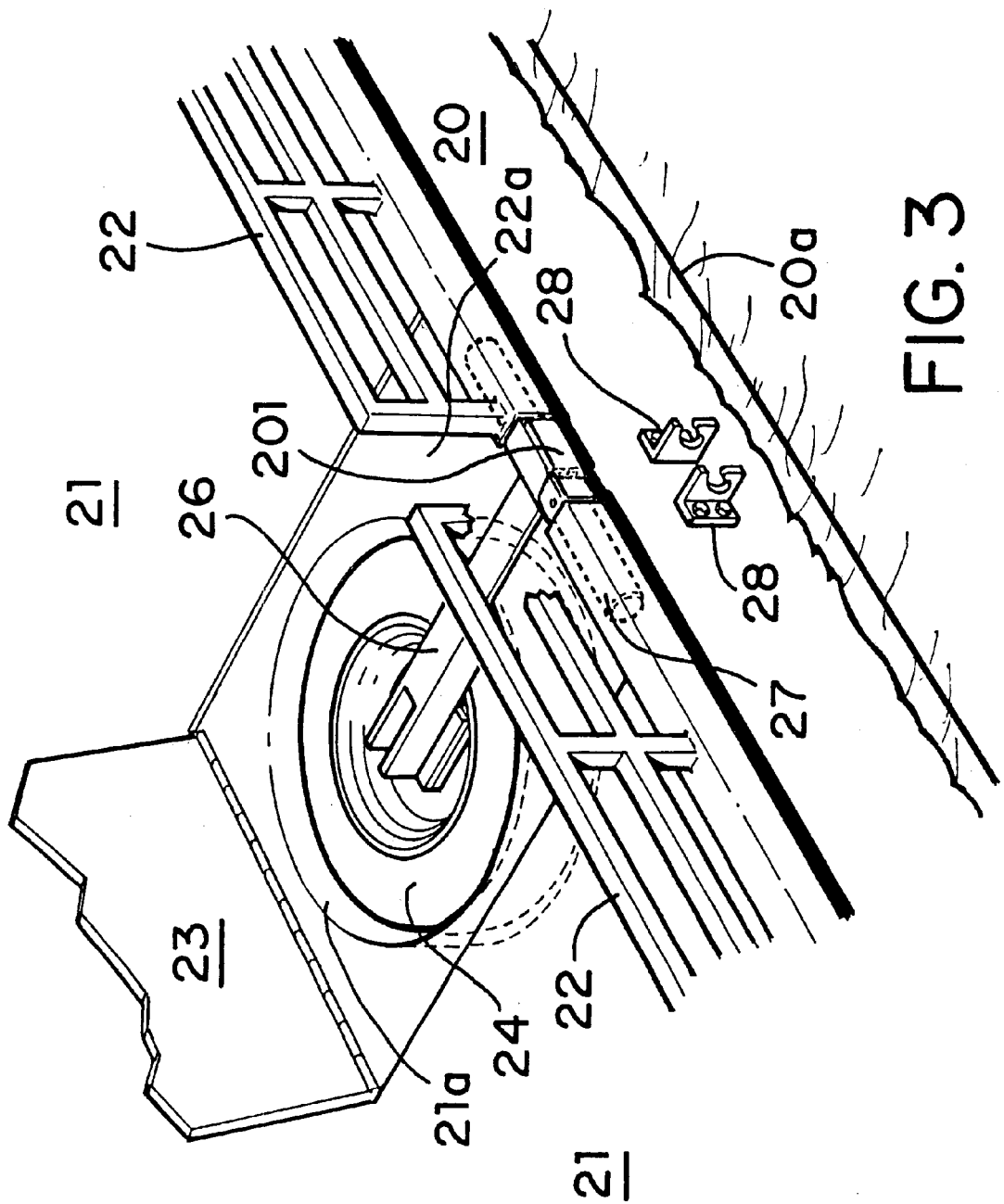
FIG. 3 shows a wheel of the boat in a stored position.

Turning now to FIG. 3 which shows the wheel 24 stored in the wheel well 21a just under the deck 21. To completely hide the wheel under the deck 21, all that remains to be done is to close the hinged cover 23. It can now be seen that the wheel 24 underwent a rotation of substantially 270° from engagement with a road surface to a storage position. The same reference characters of previous FIGS. have been used to identify the same elements.

Figure 4:
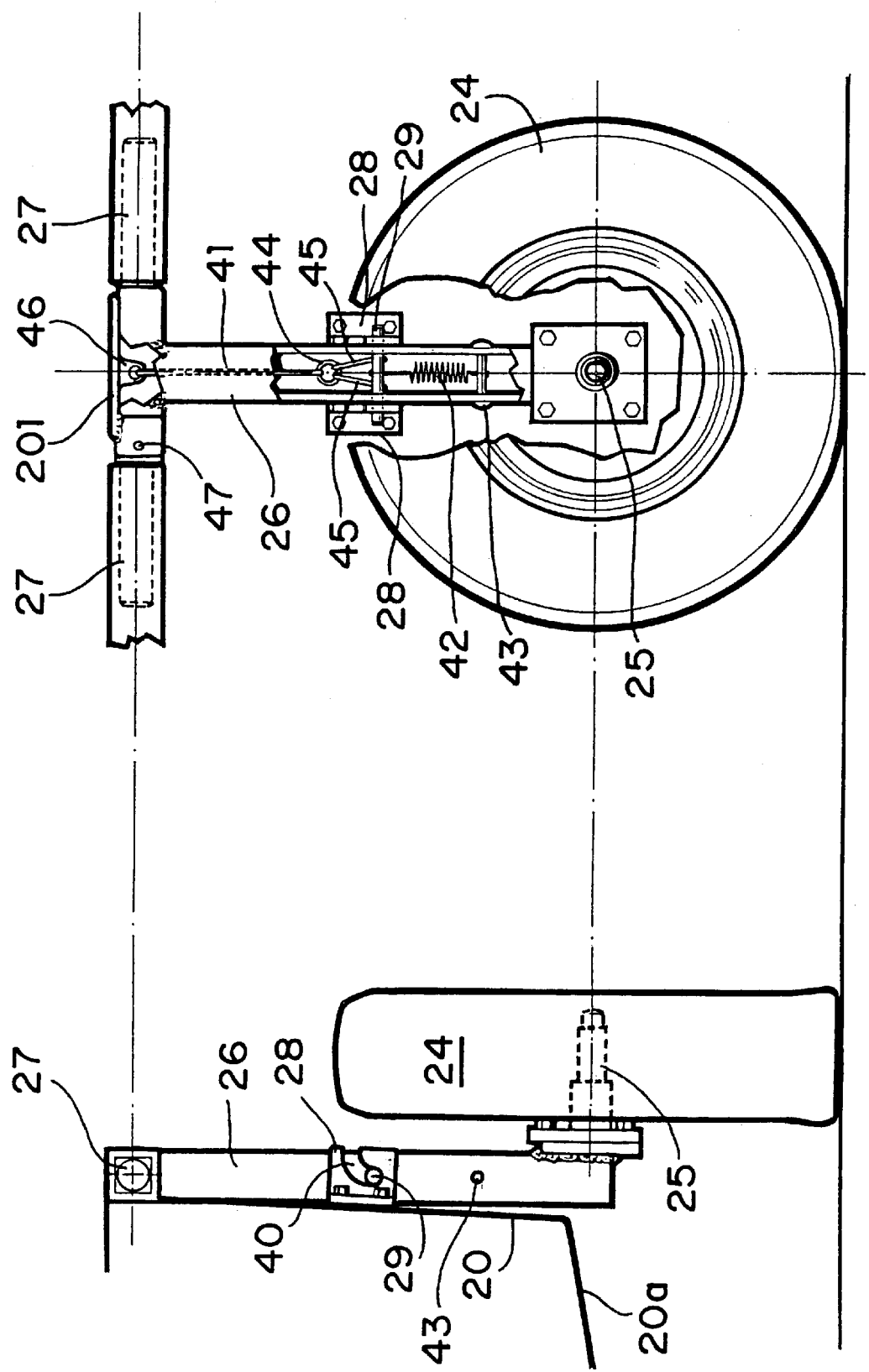
FIG. 4 is an illustration of the wheel lock release mechanism.

FIG. 4 will describe the locking elements that are associated with the support column 26. Again like reference characters are being used on like elements. To this end, the support column 26 can be of a U-shaped or a square channel configuration. The locking pin 29, that is received in the downwardly curved channel 40, is always biased downwardly by a tension spring 42 which finds its counter tension point at a cross pin 43. The locking pin is also engaged by a stirrup 45 connected to a ring 44. The ring 44 is engaged by a cable 41 which is fastened to an eyelet 46 on an operating plate 201. The operating plate 201 is hinged to a support beam of the boat by a hinge pin 47. It now be seen that when the boat as a trailer has its wheels 24 engaged with a ground surface and it is desirable to retract the wheels, all one has to do is to lift the hinge plate 201 on one end whereby the cable 41 will be pulled up while taking along the locking pin 29 against the bias of the spring 42. The locking pin 29 will slide upwardly in its own slot whereby the curved channel 40 will force the support column out of the brackets to thereby release the column 26. In reverse, when re-engaging the support column 26 into a support position all that is necessary is to bring the support column 28 back down between the brackets 28 and a further push will force the locking pin into the opening of the curved channel 40 and then down into the curved channel 40 because of the bias of the spring 42.

FIG. 5 will now illustrate the operation of the invention. It is assumed that the wheel is in a ground surface engaging position. When the latch plate 201 is pulled upwardly, the cable 41 with its stirrup 44 and 45 will pull the locking pin 29 upwardly against the bias of the spring 41. The locking pin 29 now moves out of the curved channel 40 whereby the support column 26 will be released from the brackets 28 and the wheel can swing upwardly. Because of the pneumatic tire of the wheel 24, the wheel 24 will float upwardly until it meets its own equilibrium relative to the water level. At this point a hand or a hooked rod can pull the wheel further upwardly and the wheel together with its support column will swing further around the hinge pin 27 until the wheel is stored in the wheel well 21*a*. After the wheel is stored, the wheel 24 together with its support column 26 has made a rotation of substantially 270° from the point of ground engagement to the point of storage. After the cover 23 is closed the wheel 24 including the support column 26 is completely hidden from view.

What I claim is:

1. A boat to trailer conversion apparatus comprising a pneumatic wheel being supported on a support column, said support column is hingedly connected to a side of said boat, means for rotating said wheel and said support column from a ground surface engaging position to a storage position below a deck of said boat through an angle of substantially 270 degrees, said means for rotating rotates said wheel in a direction which is normal to the longitudinal direction of said boat, including means for releasably arresting said column between brackets on said side of said boat when said wheel is in a ground engaging position, wherein said means for releasably arresting includes a locking pin slidably received in a slot in said column, said locking pin is movable in a curved slot in each of said brackets from an arrest position to a release position including means for biasing said locking pin to a downward position, including means for moving said locking pin upwardly against said means for biasing from said deck of said boat.

2. The apparatus of claim 1 wherein said wheel is received in a wheel well when in storage below said deck of said boat.

3. The apparatus of claim 2 including a cover for said wheel well.

4. The apparatus of claim 1 including a tow bar for said boat, said tow bar has means for being extended from said boat into a towing position or a retracted position within said boat into an inactive position.

5. The apparatus of claim 4 including means for arresting said tow bar in either of said positions.

6. The apparatus of claim 1, wherein said boat is a pontoon boat.

7. The apparatus of claim 1, wherein said boat is a flat bottom boat.

* * * * *